(12) United States Patent
Hemingway et al.

(10) Patent No.: US 7,962,397 B2
(45) Date of Patent: Jun. 14, 2011

(54) EMPLOYEE STOCK OPTION APPRECIATION RIGHTS SECURITIES AUCTION PROCESS

(75) Inventors: William David Hemingway, Salt Lake City, UT (US); James G. Livingston, Alpine, UT (US); Evan Martin Hill, Sandy, UT (US); Rick Davis Burtenshaw, Cottenwood Heights, UT (US); Gary Bernard Hansen, Salt Lake City, UT (US); Eric John Pehrson, Sandy, UT (US); Larry Ross Denham, Farmington, UT (US); Ronald C. Hanks, Salt Lake City, UT (US); James Reed Cooper, Centerville, UT (US); James Brady Palmer, Riverton, UT (US); Robert Lynn Bartleson, North Salt Lake, UT (US); Jonathan Eric Bacon, Bountiful, UT (US); Shelene Brown, Centerville, UT (US); Richard J. Sullivan, Littleton, CO (US); Nick Robert Watne, Murray, UT (US); Henry Conrad Wurts, Salt Lake City, UT (US); Doyle L. Arnold, Salt Lake City, UT (US); Thomas E. Laursen, Park City, UT (US)

(73) Assignee: Zions Bancorporation, Salt Lake City, UT (US)

( * ) Notice: Subject to any disclaimer, the term of this patent is extended or adjusted under 35 U.S.C. 154(b) by 908 days.

(21) Appl. No.: 11/617,533

(22) Filed: Dec. 28, 2006

(65) Prior Publication Data
US 2008/0033858 A1 Feb. 7, 2008

Related U.S. Application Data

(60) Provisional application No. 60/754,375, filed on Dec. 28, 2005, provisional application No. 60/812,269, filed on Jun. 9, 2006, provisional application No. 60/828,008, filed on Oct. 3, 2006.

(51) Int. Cl.
G06Q 40/00 (2006.01)
(52) U.S. Cl. ............... 705/36 R; 705/35; 705/37
(58) Field of Classification Search .................. None
See application file for complete search history.

(56) References Cited

U.S. PATENT DOCUMENTS

| 6,161,099 A | 12/2000 | Harrington et al. |
| 6,618,707 B1 * | 9/2003 | Gary ............ 705/36 R |
| 6,629,082 B1 | 9/2003 | Hambrecht et al. |

(Continued)

OTHER PUBLICATIONS

Philip Brown, & Elissa Yew. (2002). How do investors regard ESOs? Australian Accounting Review, 12(1), 36-42. Retrieved Dec. 29, 2010, from Accounting & Tax Periodicals. (Document ID: 113304143).*

(Continued)

Primary Examiner — Olabode Akintola
Assistant Examiner — Muriel Tinkler
(74) Attorney, Agent, or Firm — Kory D. Christensen; Stoel Rives LLP

(57) ABSTRACT

An online auction process for derivative securities is used to determine a fair market value of an asset or benefit provided to others, such as employee stock options. In one embodiment, the derivative securities track the intrinsic value realized by employees when exercising the employee stock options granted to them by their employers. The derivative securities may include rules for handling modifications to an employee stock option grant and/or rules for handling forfeitures of some or all of the employee stock options.

66 Claims, 8 Drawing Sheets

U.S. PATENT DOCUMENTS

| | | | |
|---|---|---|---|
| 6,850,924 | B2 | 2/2005 | Grimse et al. |
| 7,136,833 | B1 | 11/2006 | Podsiadlo |
| 7,337,141 | B2 * | 2/2008 | Sullivan et al. .................. 705/37 |
| 2001/0056394 | A1 * | 12/2001 | Hamada ........................... 705/37 |
| 2003/0014351 | A1 * | 1/2003 | Neff et al. ........................ 705/37 |
| 2004/0267656 | A1 | 12/2004 | Friedman et al. |
| 2005/0086148 | A1 * | 4/2005 | Woodruff et al. ............... 705/36 |
| 2005/0091133 | A1 | 4/2005 | Ballman |
| 2006/0031152 | A1 * | 2/2006 | Eapen .............................. 705/37 |
| 2006/0080218 | A1 | 4/2006 | Seaman et al. |
| 2006/0184446 | A1 * | 8/2006 | Ross ................................ 705/37 |
| 2006/0212377 | A1 | 9/2006 | Smith et al. |
| 2007/0112658 | A1 | 5/2007 | Dryden |

OTHER PUBLICATIONS

Hemmer, Thomas, Matsunaga, Steve, & Shevlin, Terry. (1994). Estimating the 'fair value' of employee stock options with e. Accounting Horizons, 8(4), 23. Retrieved Dec. 29, 2010, from ABI/INFORM Global. (Document ID: 5332740).*

Statement of Financial Accounting Standards No. 123 (revised 2004) Share-Based Payment (SFAS 123R), issued by Financial Accounting Standards Board. (Dec. 2004).

Helft, M. and Norris, F. "Google to Offer Variation on Stock Options," The New York Times, Dec. 13, 2006, available at <http://www.nytimes.com/2006/12/13/technology/13google.html?_r2&oref=slogin&page...>, last accessed Oct. 9, 2007.

Zwirn, E, "Making a Market for Stock Options," CFO.com, May 2005, available at <http://www.cfo.com/pintable/article.cfm/3980349?f=options>, last accessed Oct. 9, 2007.

Whitehouse, T, "Cisco's Stock Option Method Raises Eyebrows; More" Compliance Week May 17, 2005, available at <http://www.complianceweek.com/index.cfm?printable=1&fuseaction=article.viewArticle...> last accessed Jul. 11, 2005.

* cited by examiner

US 7,962,397 B2

EMPLOYEE STOCK OPTION APPRECIATION RIGHTS SECURITIES AUCTION PROCESS

RELATED APPLICATIONS

This patent application claims priority to U.S. Provisional Patent Application No. 60/754,375, filed Dec. 28, 2005, U.S. Provisional Patent Application No. 60/812,269, filed Jun. 9, 2006, and U.S. Provisional Patent Application No. 60/828,008, filed Oct. 3, 2006, each of which are hereby incorporated by reference herein in their entirety.

FIELD OF THE DISCLOSURE

This disclosure relates generally to financial securities. More particularly, this disclosure relates to online auctioning of derivative securities to bidders, including retail bidders, to determine a value of a stock option.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
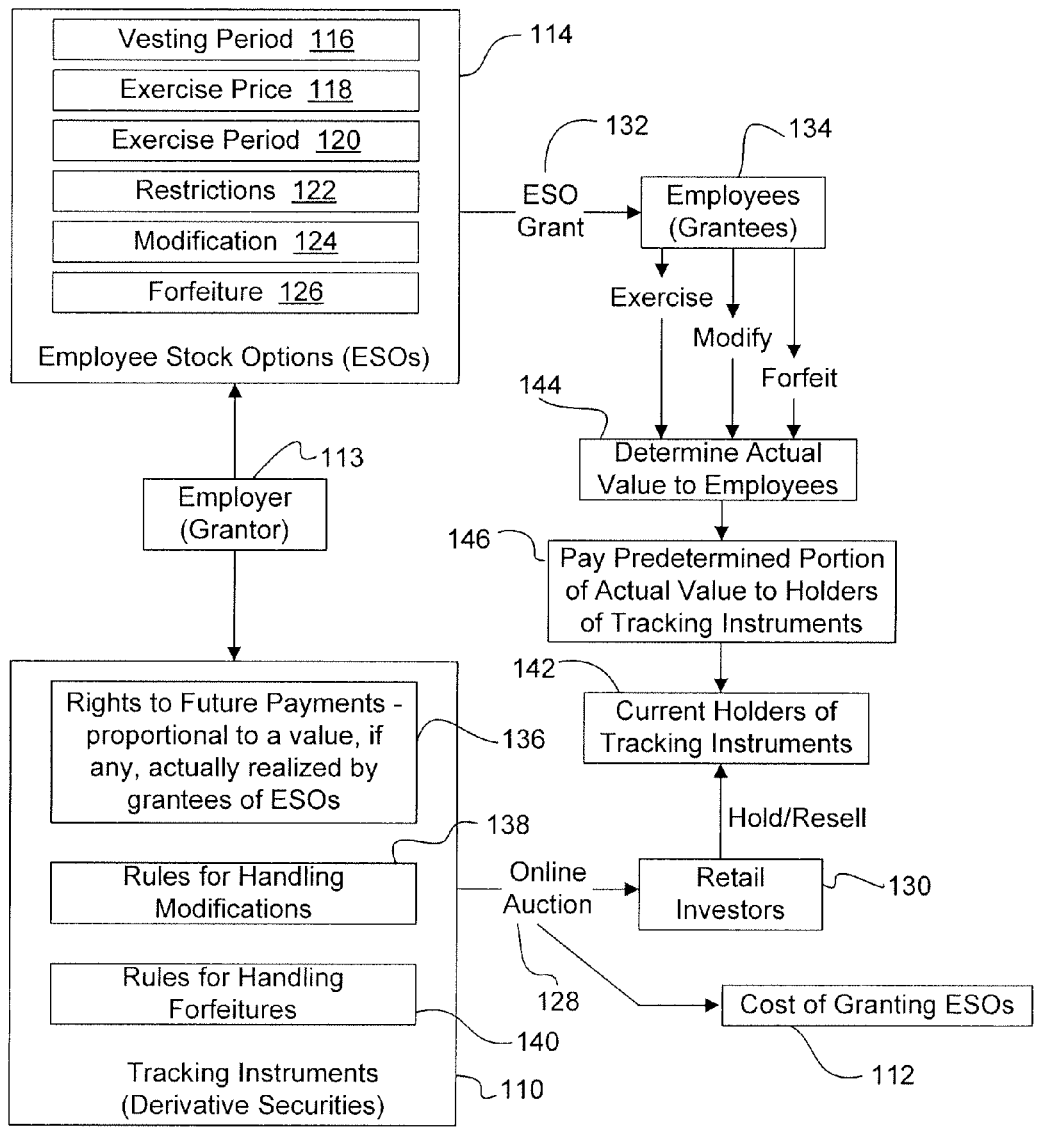
FIG. 1 is a block diagram illustrating the use of tracking instruments for estimating the expense of granting employee stock options according to one embodiment.

Overview of Market-Based Approach to Valuing Employee Stock Options

Disclosed herein is an online auction process for derivative securities used to determine a fair market value of an asset or benefit provided to others. While the derivative securities may correspond to any type of asset or benefit, certain embodiments disclosed herein are directed to derivative securities that track the intrinsic value realized by employees when exercising employee stock options granted to them by their employers.

An artisan will recognize from the disclosure herein that a "derivative security" is a broad term used herein in its ordinary sense and includes, for example, a contract that specifies the rights and obligations between an issuer of the derivative security and a holder of the derivative security to deliver or receive future cash flows (or other assets or securities) based on some future event. The future event may include, for example, the exercise of an employee stock option or other type of option. When used to estimate the value of an asset or benefit, the derivative security may be referred to herein as a "tracking instrument." Further, referring to example embodiments that use a derivative security to estimate the value of employee stock option grants, a derivative security may be referred to herein as an Employee Stock Option Appreciation Rights Security, or "ESOARS."

With the promulgation of Statement of Financial Accounting Standards No. 123(R) (FAS 123R), the Financial Accounting Standards Board (FASB) requires the expensing of employee stock options (ESOs). However, there are many features of ESOs that make using conventional option-pricing models inappropriate (e.g., a Black-Scholes model). These features include, for example, the typically long-term nature of ESOs, vesting conditions, nontransferability, nonhedgeability, blackout periods, suboptimal exercise by employees, termination of employees and other forfeiture features.

To arrive at a more accurate option-pricing estimate than that provided by models, the online auction process for contractual rights to future payments disclosed herein parallels the intrinsic value realized by employees for stock options received from their employers. The purpose is to enable companies to obtain a fair market value of these ESOARS for the purpose of FAS 123R employee option compensation expense accounting. In one embodiment, the process follows an online public auction format, which is open to all qualified investors, is arms-length, and is completely transparent. The ESOARS sold through the auction process provide cash flows to the investor that are a percentage of intrinsic value realized through the exercising of options held by employees.

A market approach that includes a fair and open auction for contracts returning to investors payments that track intrinsic value realized by grantees enables a company to determine a fair market value for employee stock options. The market impounds the effects of differences between employee options and regular options and arrives at a fair value. This is a more reasonable approach than either using models that do not account for all of the features of the instruments or making ad hoc adjustments to existing models. Supply and demand forces and investors' self interest drive the price to its true value.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described will be illustrated as software modules or components. As used herein, a software module or component may include any type of computer instruction or computer executable code located within a memory device. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Tracking Instruments

FIG. 1 is a block diagram illustrating the use of tracking instruments 110 for estimating the expense 112 to an employer 113 of granting employee stock options 114 (ESOs 114) according to one embodiment. Generally, the ESOs 114 provide a compensation benefit to employees by allowing the employees, after a vesting period 116, to exercise the ESOs 114 by purchasing stock (securities) in the employer's company at a predetermined exercise price 118 during an exercise period 120. The ESOs 114 are generally subject to many restrictions 122 (e.g., nontransferability, nonhedgeability, and blackout periods), modification 124, and forfeiture 126. As discussed above, conventional option-pricing models are inappropriate for the ESOs 114 due to the generally long vesting periods 116, the restrictions 122, and the other features such as possible modification 124 and forfeiture 126.

Thus, in one embodiment, a market-based approach is used to determine the value of the ESOs 114 for FAS 123R and/or other financial accounting purposes. In the market-based approached disclosed herein, the employer 113 (grantor) provides the tracking instruments 110 via an online auction 128 to retail investors 128. As discussed below, in one embodiment, the tracking instruments 110 are auctioned at substantially the same time (e.g., the same day or before markets open the next day) as the grant 132 of the ESOs 114 to the employees 134, or on another day when valuation of the ESOs 114 is desired or required (e.g., by FAS 123R).

The tracking instruments 110 comprise contractual rights 136 to future payments, rules 138 for handling any modifications 124 to the ESO grant 132, and rules 140 for handling any forfeitures 126 of the ESOs 114 by the employees 134. The rights 136 to future payments are proportional to a value, if any, actually realized by the employees 134 upon exercising their respective ESOs 114. Accordingly, each holder of one or more of the tracking instruments 110 will respectively receive a pro rata share of the net value of the ESOs 114 realized as the employees 134 exercise their respective ESOs 114.

The online auction 128 of any amount of the tracking instruments 110 may result in a valid fair market value of the ESO grant 132. Just as the market value of an enterprise is determinable each day based on a small fraction of the total shares of common stock outstanding exchanged, the tracking instruments 110 may be used to pay investors only a small proportion of the expenses incurred by the company to thereby measure the fair market value of the ESO grant 132. However, in order to attract a meaningful number of qualified bidders, the tracking instruments 110 according to one embodiment pay holders approximately 10% of the actual intrinsic value of the ESOs 114 that are exercised. An artisan will recognize from the disclosure herein that other percentages may also be used. For example, in other embodiments, the tracking instruments 110 pay holders between approximately 5% and approximately 15% of the actual intrinsic value of the ESOs 110 that are exercised. Further, percentages below 5% and above 15% (e.g., 100%) may also be used.

In one embodiment, approximately one tracking instrument 110 is auctioned for each ESO 114 granted to the employees 134. This provides the retail investors 130 with a simple one-to-one correspondence between the tracking instruments 110 and the ESOs 114 and allows smaller investors 130 to bid on relatively small fractions of the value of the overall ESO grant 132. However, in other embodiments, a plurality of ESOs 114 is granted for each tracking instrument 110 provided through the online auction 128. For example, in one embodiment, approximately 100 ESOs 114 are granted for each tracking instrument 110 initially sold to the retail investors 130 because traditional stock options are traded in units of 100. Of course, an artisan will recognize from the disclosure herein that any number of ESOs 114 may be granted for each tracking instrument 110.

In another embodiment, to maintain the notion of one tracking instrument 110 approximately equaling one ESO 114, the ratio of tracking instruments 110 to ESOs 114 is approximately equal to the portion of the actual intrinsic value of the ESOs 114 specified to be paid to the holders of the tracking instruments 110. For example, if the tracking instruments 110 pay holders approximately 10% of the actual intrinsic value of the ESOs 114 that are exercised, then the number of tracking instruments 110 auctioned approximately equals 10% of the number of ESOs 114 provided in the ESO grant 132. In such an embodiment, the valuation of each tracking instrument unit 110 (e.g., the price paid for the tracking instruments 110 through the auction 128) is approximately equal to the expense of each employee stock option in the ESO grant 132 (which may be adjusted for factors such as pre-vesting forfeitures, as discussed below).

The above example illustrates one embodiment for deriving the expense of the ESO grant 132 from a market valuation of the tracking instruments 110. The derived expense is based on a particular ratio of tracking instruments 110 to ESOs 114. An artisan will recognize from the disclosure herein that the expense of the ESO grant 132 may also be derived for other ratios of tracking instruments 110 to ESOs 114. In other words, the estimated expense of the ESO grant 132 depends on the ratio of tracking instruments 110 to ESOs 114 and the rights to future payments 136 provided to holders of the tracking instruments 110. If, for example, there are approximately equal numbers of tracking instruments 110 and ESOs 114, and the tracking instruments 110 are structured to pay 5% of the actual intrinsic value of the ESOs that are exercised, then the total value of the tracking instruments 110 (as determined by the online auction 128) is approximately 5% of the expense of the ESO grant 132. As discussed below, the valuation of the tracking instruments 110 may be adjusted for factors such as pre-vesting forfeitures.

Upon completion of the online auction 128, the winning bidders (discussed below) from among the retail investors 130 are notified. In one embodiment, the tracking instruments 110 are deposited with a Depository Trust Corporation (DTC) and all clearing takes place using well-established mechanisms. In another embodiment, the winning bidders are provided with a certificate indicating ownership of their respective tracking instruments.

There are no restrictions on aftermarket trading or hedging of the tracking instruments. The current holders 142 of the tracking instruments 110 may be the initial retail investors 130 and/or aftermarket investors (not shown). The retail investors 130 who purchased the tracking instruments 110 through the online auction 128 may either hold their respective tracking instruments 110 or may resell all or a portion of their respective tracking instruments 110 to the aftermarket investors.

For example, in one embodiment, the website used to initially auction the tracking instruments 110 may also be used to create a secondary market where current holders of the tracking instruments 110 may auction or otherwise sell their respective interests in the ESO grant 132. Each tracking instrument 110 may be assigned a CUSIP (Committee on Uniform Securities Identification Procedures) number at issue and the employer 113 (or a bank or auction agent) may work with TRACE (Trade Reporting and Compliance Engine) and/or other transaction data providers to record and disseminate post-auction tracking instrument 110 trade data.

As the employees 134 exercise their respective ESOs 114 after the vesting period 116, the actual value 144 realized by the employees 134 is determined. As discussed in detail below, the actual value 144 realized by the employees 134 depends on the number of ESOs 114 that vest, whether the trading price of the employer's underlying securities exceeds the exercise price 118, and the number of ESOs 114 that the employees 134 choose to exercise during the exercise period 120. Further, the actual value 144 may depend on the rules 138 for handling any modifications 124 to the ESO grant 132 and/or the rules 140 for handling any forfeitures 126 of the ESOs 114 by individual employees 134.

Periodically, as the employees 134 exercise the ESOs 114, the current holders 142 of the tracking instruments 110 are paid 146 the predetermined portion of the actual value 144 realized by the employees 134. Again, the predetermined portion is specified by the rights 136 to future payments in the tracking instruments 110. Thus, by way of example, if the rights 136 specify 10% of the actual value 144 realized by the employees 134, then the current holders 142 of the tracking instruments 110 would each receive a pro rata share of 10% of the actual value 144, depending on each of the holders 142 respective share of the tracking instruments 110.

Figure 2:
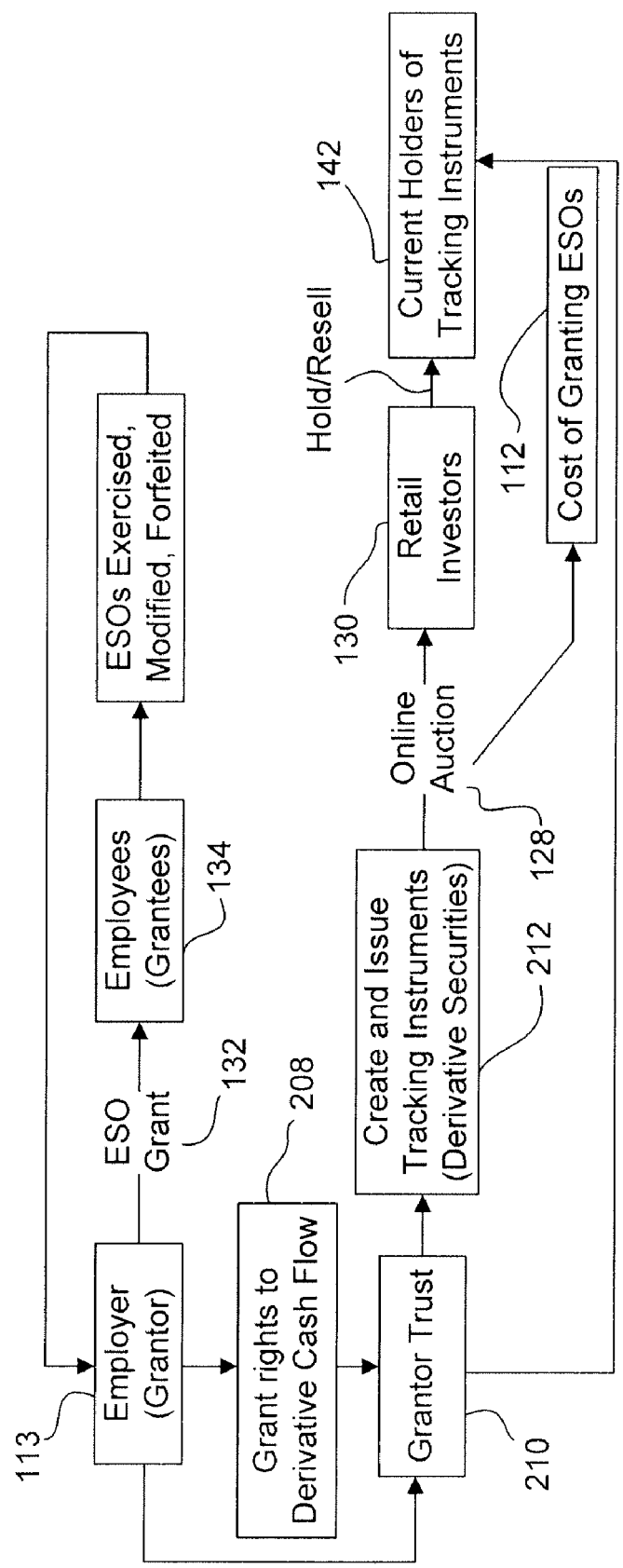
FIG. 2 is a block diagram illustrating the involvement of a grantor trust to create, issue and auction the tracking instrument of FIG. 1 according to another embodiment.

In one embodiment, the employer 113 directly creates, issues, and sells, to the retail investors 130, the tracking instruments 110. However, as shown in FIG. 2, in another embodiment, the employer 113 grants 208 all rights 136 to the future cash flow to a grantor trust 210, which in turn creates and issues 212 the tracking instruments 110 of FIG. 1. The grantor trust 210 performs the online auction 128 to sell the tracking instruments 110 to the retail investors 130. As discussed above, the retail investors 130 may hold or resell their respective tracking instruments 110. The grantor trust 210 auctions 128 the tracking instruments 212 on or near the same day as the ESO grant 132, or at such other time as desired or required to determine the value of the ESO grant 132.

The employer 113 tracks the exercise of the ESOs 114, forfeited ESOs 114, and modifications to the ESO grant 132, and provides this tracking information to the grantor trust 210. The grantor trust 210 uses this information, as discussed herein, to provide pro rata payments to the current holders 142 of the tracking instruments 110 in proportion to the actual value, if any, realized by the employees 134 for the ESOs 114.

Figure 3:
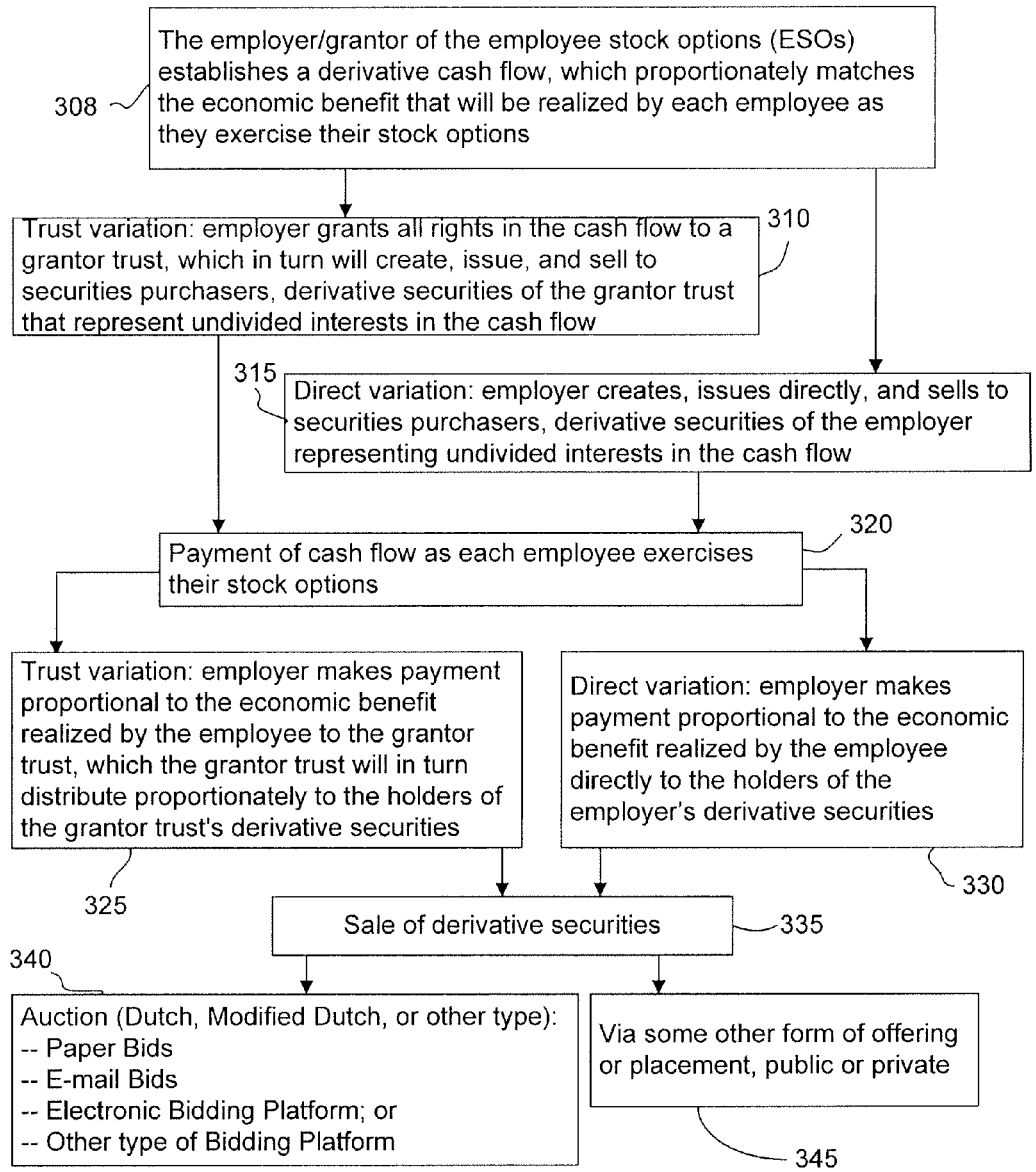
FIG. 3 is a flow chart of certain embodiments for selling rights to a derivative cash flow corresponding to employee stock options.

By way of summary, FIG. 3 is a flow chart of certain embodiments for selling rights to a derivative cash flow corresponding to ESOs. Initially, the employer or grantor of the employee stock options establishes 308 a derivative cash flow, which proportionately matches the economic benefit that will be realized by each employee as they exercise their stock options. As discussed above, it is currently anticipated that the proportion will be from approximately 5% to approximately 100%. However, other proportions may be used.

As discussed above, this process may be carried out in two possible variations. First, in the trust variation, the employer grants 310 all rights in the cash flow to a grantor trust, which in turn will create, issue, and sell to securities purchasers derivative securities of the grantor trust that represent undivided interests in the cash flow.

Second, in the direct variation, the employer creates 315, issues, and sells, to securities purchasers, derivative securities of the employer representing undivided interests in the cash flow.

The payment 320 of cash flow as employees exercise their stock options may also vary depending on the variation of the process. In the trust variation, the employer makes 325 a payment proportional to the economic benefit realized by the employee to the grantor trust, which the grantor trust will in turn distribute 325 proportionately to the holders of the grantor trust's derivative securities.

In the direct variation, the employer makes 330 payment proportional to the economic benefit realized by the employee directly to the holder of the employer's derivative securities.

The sale 335 of derivative securities may also vary. In one embodiment, an auction may be held. The auction may be 340 a Dutch auction, a modified Dutch auction, or other type of auction. These may include paper bids, e-mail bids, electronic bidding platforms, or other types of bidding platforms.

In an alternative embodiment, some other form of offering or placement, public or private, may be employed 345.

Determining Payments to Holders of Tracking Instruments

Figure 4:
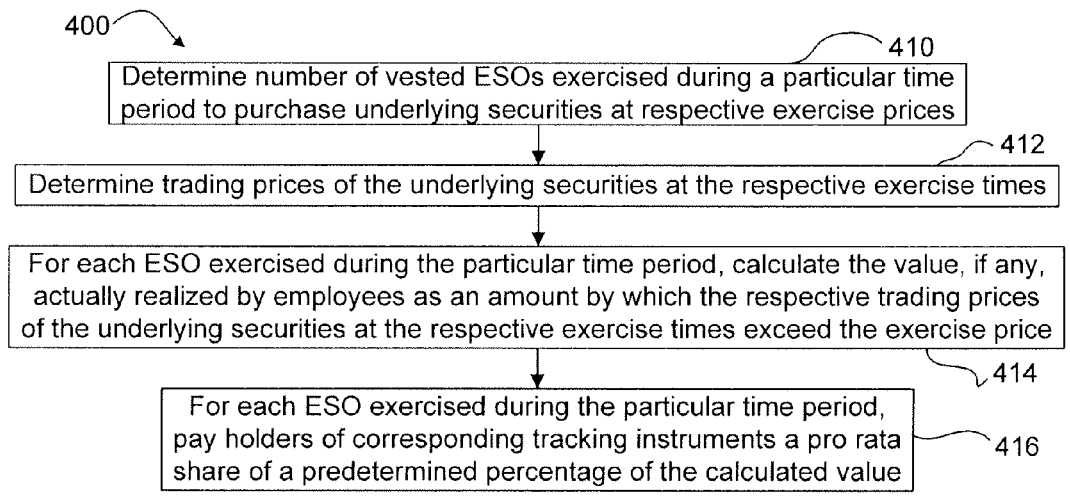
FIG. 4 is a flow chart of a method for paying holders of tracking instruments according to one embodiment.

FIG. 4 is a flow chart of a method 400 for paying holders 142 of tracking instruments 110 according to one embodiment. Payments are made, according to certain embodiments, either monthly, quarterly, semi-annually, annually, or on some other predetermined periodic basis. For example, in one embodiment, current holders 142 of tracking instruments 110 are paid quarterly as this frequency strikes a good balance between payment processing costs and liquidity concerns for the holders 142. A quarterly payment schedule is also similar to the payment frequency for equity securities (dividends).

The method 400 includes determining 410 a number of vested ESOs 114 exercised by employees 134 during a particular time period to purchase underlying securities at respective exercise prices 118. The particular time period may be a portion of the exercise period 120. The method 400 also includes determining 412 trading prices of the underlying securities (the employer's stock) at the respective exercise times. The ESOs 114 may be exercised on different days or times during the particular time period. Thus, the method 400 tracks trading prices as each of the ESOs 114 are exercised.

For each of the ESOs 114 exercised during the particular time period, the method 400 calculates 414 the value, if any, actually realized by the employees. The value is equal to an amount by which the respective trading prices of the underlying securities at the respective exercise times exceed the exercise price 118 of the exercised ESOs 114. Then, for each of the ESOs 114 exercised during the particular time period, the method 400 pays 416 the current holders 142 of the tracking instruments 110 a pro rata share of the predetermined percentage of the calculated value specified by the tracking instruments 110. The pro rata share is based on the number of tracking instruments 110 held by each of the current holders 142.

Online Auction

As discussed above, the tracking instruments 110 may be priced and allocated using an online auction process through a website. The auction may be analogous to municipal bond auctions that some banks operate for the public sale of municipal bonds. Details of upcoming auctions for the tracking instruments 110 are distributed in advance to known potential bidders. Public notices may also be given to the financial press. In one embodiment, the information provided to potential investors does not include an expected price range or overall maximum bid price. Suggested bid ranges and/or maximums generally interfere with the fair and open determination of the fair value by unduly influencing or otherwise limiting bidders with respect to pricing.

Figure 5:
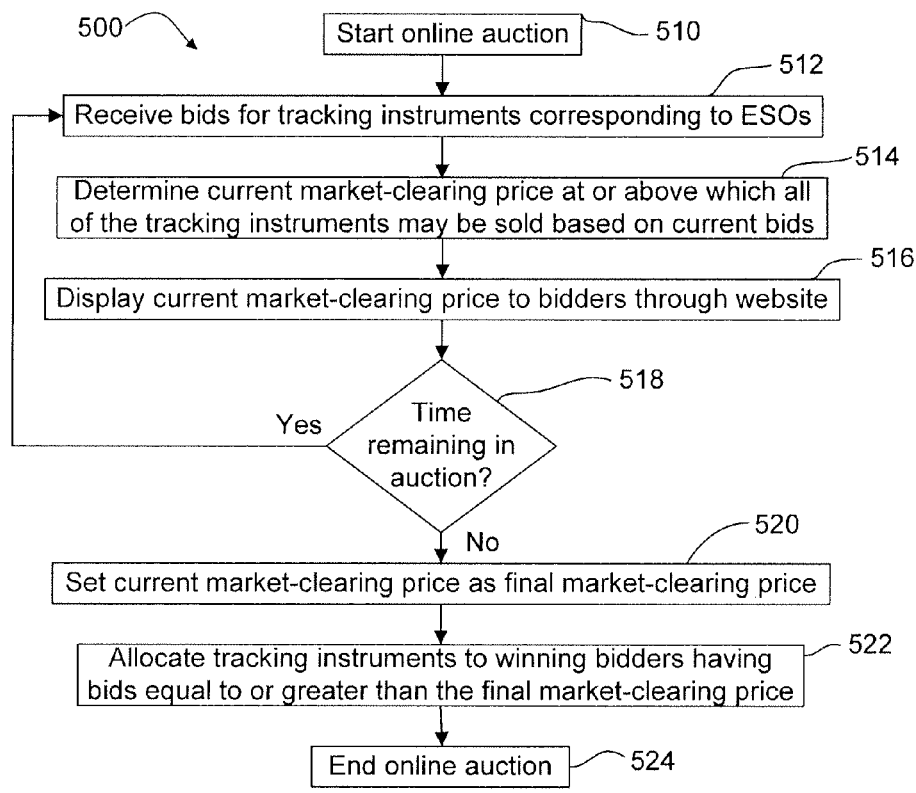
FIG. 5 is a flow chart of a method for auctioning tracking instruments according to one embodiment.

FIG. 5 is a flow chart of a method 500 for auctioning tracking instruments 110 according to one embodiment. After starting 510 the online auction, an application server of an auction website receives 512 bids for tracking instruments 110 corresponding to ESOs 114 of a particular ESO grant 132. In one embodiment, early bids may also be received from bidders before the start 510 of the online auction. Thus, investors who may otherwise be unavailable during the auction period may participate in the auction by submitting early bids. In one embodiment, an early bid form may be downloaded from the auction website and submitted via, for example, the auction website, email, fax or letter.

The tracking instruments 110 are relatively complex and risky securities that do not have direct analogs in the marketplace frequented by most investors. Therefore, in one embodiment, bidders are requested to open an account and/or make a deposit. The bidders may also be prescreened to filter out investors for which the tracking instruments 110 are less likely to be suitable. In one embodiment, potential bidders are provided with a suitability questionnaire, such as a NASD (National Association of Securities Dealers) suitability questionnaire, when applying for a brokerage account. The questionnaire asks potential bidders to identify, for example, their risk tolerance, investment time horizon, and investment objectives. In one embodiment, investors who agree that they have high risk tolerance, a moderate or long investing time horizon and chose speculative trading as one of their investment objectives are allowed to bid for the tracking instruments 110.

In addition to these questions, potential bidders may be probed to determine their understanding of the risks of purchasing the tracking instruments 110. For example, in one embodiment, potential bidders are asked how much they are willing to invest and how much they were willing to lose. The minimum of these two answers is used to set a maximum bid amount. In addition, or in other embodiments, potential bidders may be asked how much they could lose on a $100,000 investment in the tracking instruments 110. If the investor does not answer $100,000, they are contacted to determine whether they understand the nature of the risks of investing in the tracking instruments 110.

In one embodiment, the server identifies bidders only by a bidder number that changes with each auction and is not tied to any personally identifiable information. Thus, the bidders' identities are protected. Once a bid has been submitted, it cannot be lowered or retracted.

In one embodiment, each bidder may place up to five (or another predetermined number) separate, concurrent bids that are each independent of the other. Each of the bids corresponding to a particular bidder may be made for a different numbers of tracking instruments 110 and for different bid prices. In one such embodiment, a bidder will not be able to place an individual bid that exceeds that bidder's maximum bid amount. Thus, a bidder who has one active bid will be able to bid up to her/his maximum bid amount in that one bid. However, a bidder who has, for example, three active bids will be able to bid up to her/his maximum bid amount for each individual bid. However, the bid of a bidder who has placed multiple bids may be deemed to be "in the money" (as discussed below) only to the extent that the aggregate value of the multiple bids is less than or equal to that bidder's maximum bid amount. In short, while a bidder may place multiple bids, each up to her/his maximum bid amount, the most tracking instruments 110 that an "in the money" bidder may be allocated will be that number that his maximum bid amount will purchase.

After receiving bids for at least as many tracking instruments 110 as are being offered, the server determines 514 a current market-clearing price, defined as the highest price at or above which all of the tracking instruments 110 for the ESO grant 132 may be sold based on current bids. To determine the current market-clearing price, the server moves down a list of bids in descending order of price until the total quantity of tracking instruments 110 bid for is at least as large as the number of tracking instruments 110 being sold. For example, assume that 100,000 tracking instruments 110 are being offered and bids have been received from bidders A, B and C according to the table below:

| Bidder | No. of Tracking Instruments Requested in Bid | Bid Price/Tracking Instrument |
|--------|-----------------------------------------------|-------------------------------|
| A      | 50,000                                        | $100.00                       |
| B      | 50,000                                        | $ 75.00                       |
| C      | 50,000                                        | $ 50.00                       |

In this example, $100.00 is not the market-clearing price because only 50,000 of the 100,000 tracking instruments 110 offered can be sold for at least $100.00. Further, $50.00 is not the market-clearing price because, although all of the 100,000 tracking instruments 110 could be sold for $50.00 or more, $50.00 is not the highest price at which all of the tracking instruments 110 can be sold. Instead, the highest price at which all of the offered tracking units 110 may be sold in this example is $75.00. Thus, the current market-clearing price is set at $75.00 and, were the auction to end at this point, 50,000 tracking instruments would be sold to bidder A for $75.00 each and 50,000 tracking instruments would be sold to bidder B for $75.00 each.

In one embodiment, the server displays 516 the current market-clearing price to the bidders through the website.

Thus, at any point in time during the auction, the bidders can observe the price at which the market would clear at that point in time. The current market-clearing price may be displayed on a bid page of the website and users may need to refresh the page, or the page may be refreshed automatically, to view the most current market-clearing price. The displayed current market-clearing price provides an indication of the auction's progress. However, as discussed below, the displayed current market-clearing price may be different than a final market-clearing price at which all of the offered tracking instruments 110 are sold.

Unlike sealed-bid auctions used, for example, by the U.S. Treasury, the method 500 provides an open auction that provides feedback to the bidders and allows them to raise their bids during the course of the auction. In one embodiment, the feedback provides an indication to a bidder as to whether or not the bidder's current bid is "in the money." If the current bid is in the money, the bid would be a winning bid if the auction were to end at that time. Thus, the online auction provides an active, dynamic market that ensures that at a fair market value is attained.

The server then queries 518 whether there is time remaining in the auction period. In one embodiment, the auction period is in a range between approximately thirty minutes to approximately 5 days. In another embodiment, the auction period is approximately 30 hours. In another embodiment, the auction period is set to be the time between the close of a securities trading market (such as the New York Stock Exchange) on one day and the open of the market on the next day. However, an artisan will recognize from the disclosure herein that many different auction periods may be used and may be based on such factors as investor attention span and investor availability.

If there is time remaining in the auction period, the server continues to receive 512 bids through the website, determine 514 the current market-clearing price based on current bids, and display 516 the current market-clearing price through the website. After the auction period ends, the server sets 520 the current market-clearing price as the final market-clearing price at which all of the offered tracking instruments 110 are sold. The server then allocates 522 the tracking instruments to the winning bidders and ends 524 the online auction. As illustrated in the example above, the bidders A and B would each receive 50,000 tracking instruments 110 at a price of $75.00 each.

In one embodiment, bids above the final market clearing price are allocated their entire respective quantities of requested tracking instruments 110. If only one bid is at the final market-clearing price, the bidder is awarded all of the remaining tracking instruments 110. If multiple bids are at the final market-clearing price, the server allocates the remaining tracking instruments 110 to the tied bidders on a pro rata basis according to the quantity bid. For example, assume again that 100,000 tracking instruments 110 are offered, and that the following bidders (D, E and F) have bid as follows:

| Bidder | No. of Tracking Instruments Requested in Bid | Bid Price/Tracking Instrument |
| --- | --- | --- |
| D | 50,000 | $100.00 |
| E | 50,000 | $ 75.00 |
| F | 50,000 | $ 75.00 |

In this example, $75.00 is the market-clearing price because it is the highest price at which all of the tracking instruments 110 may be sold. Therefore, the servers allocates 50,000 tracking instruments 110 to bidder D for $75.00 each. This leaves 50,000 tracking instruments to be allocated to bidders E and F. Because bother bidders E and F requested 50,000 tracking instruments 110, they will each be awarded 25,000 tracking instruments 110 for $75.00 each.

If on the other hand, bidder E had requested 60,000 tracking instruments 110 and bidder F had requested 30,000 tracking instruments, then bidder E would have received twice (approximately 33.333) as many of the remaining tracking instruments 110 as bidder F (approximately 16.667). In one embodiment, fractional tracking instruments are rounded up to the next whole unit. Thus, in this example, bidder E would receive 34 tracking instruments 110 for $75.00 each and bidder F would receive 17 tracking instruments 110 for $75.00 each. While this rounding up slightly increases the number of tracking instruments 110 sold, the tracking instrument 110 is designed so that the payment received for each unit is substantially unaffected.

Handling Modifications to an Original ESO Grant

A modification to an ESO grant 132 can occur under a variety of circumstances including, for example, repricing or repurchase of awards, adjustment of the term of the vesting period 116, adding reload features, and allowing transferability. Applicable accounting rules may require that the modification be treated as an exchange of the original award for a new award of equal or greater value. In order to determine the expense of a modification, the old and the new ESOs 114 are valued at the time of the modification. The disclosed process for creating and auctioning tracking instruments 110 can easily measure the value of the new ESOs 114 using a new auction of new tracking instruments 110.

However, the valuation of the original ESOs 114 that are being cancelled cannot be accomplished through the disclosed auction process because there will not be any remaining intrinsic value to be realized. FAS 123R states that in the absence of a market price, a model should be used. Further, paragraph A23 states that "[t]he valuation technique . . . should be used consistently and should not be changed unless a different valuation technique is expected to produce a better result." Since a market value is unattainable, an appropriately designed model may produce a better result. Since the holders of the original tracking instruments 110 receive a payment equal to their share of the cancellation value of the original ESOs 114, the determination of the value of the original ESO grant 132 may be made by an independent agent designated in the initial offering of the tracking instruments 110.

Figure 6:
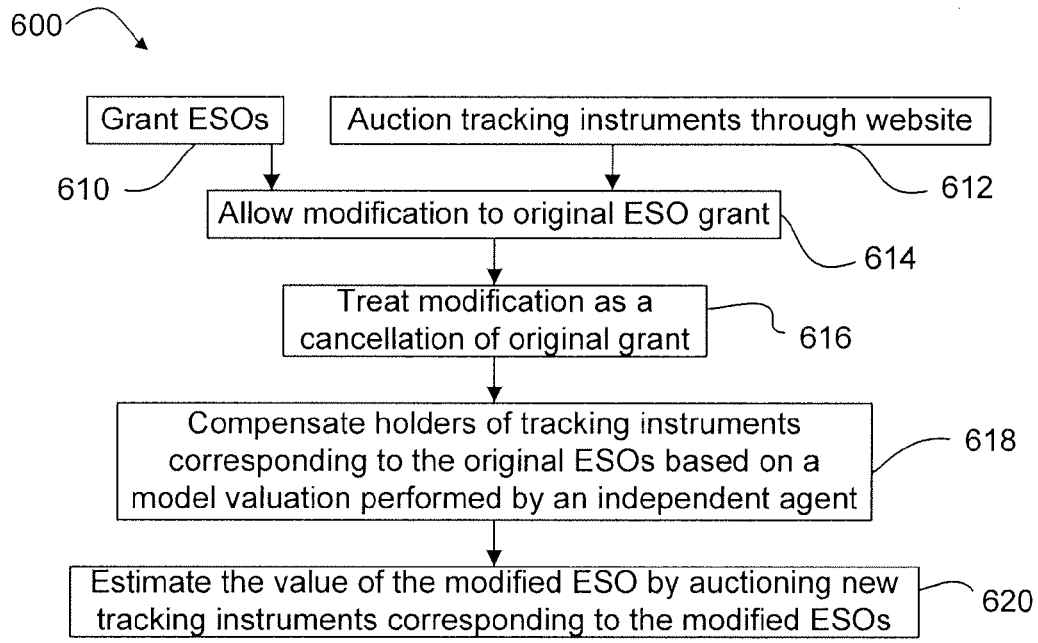
FIG. 6 is a flow chart of a method for handling modifications to employee stock options according to one embodiment.

FIG. 6 is a flow chart of a method 600 for handling modifications to ESOs 114 according to one embodiment. The method 600 includes granting 610 the ESOs 114 and auctioning 612 the tracking instruments 110, as discussed above. The method 600 allows 614 modification to the original ESO grant and treats 616 the modification as a cancellation of the original grant.

In one embodiment, the method 600 compensates 618 the current holders 142 of the original tracking instruments 110 with a pro rata share of the cancellation value of the original grant. The original auction 128 received bids on the rights 136 to cash flows that mirror the intrinsic value realized by the employees 134 from exercise of their respective ESOs 114. When the original ESOs 114 are replaced, the original expected cash flows are eliminated. FAS 123R argues that the issuing company is repurchasing the original instrument. Thus, according to this embodiment, the issuing company repurchases the cash flows that would have accrued to the current holders 142 of the original tracking instruments 110 based on a model valuation performed by an independent agent.

The method 600 then estimates 620 the value of the new or modified ESOs 114 by auctioning new tracking instruments 110 corresponding to the modified ESOs 114, as discussed in detail herein.

Handling Pre-Vesting Forfeitures

Under FAS 123R, the final total expense recognized for the ESO grant 132 over the vesting period 116 is the grant-date value per ESO 114 multiplied by the number of ESOs 114 that actually vest. For accounting purposes, the total expense is trued up over the vesting period to reflect only options that vest. In order to align payments for the tracking instruments 110 with the total expense, the ESOs 114 that are forfeited before they vest are not included in the total expense.

Investors 130 in the tracking instruments 110 purchase the right 136 to payments that are based on the entire ESO grant 132, including any ESOs 114 granted that do not vest. Thus, in one embodiment disclosed below, an expected pre-vesting forfeiture rate is disclosed to potential bidders for consideration in the bidding process and then the implied ESO grant valuation is backed out of the market value of the ESO grant derived from the auction of the tracking instrument 110. The number of tracking instruments 110 offered may be based on the expected pre-vesting forfeiture rate. In other embodiments disclosed below, the tracking instruments 110 are designed to remove pre-vesting forfeiture from consideration by the potential bidders.

Figure 7:
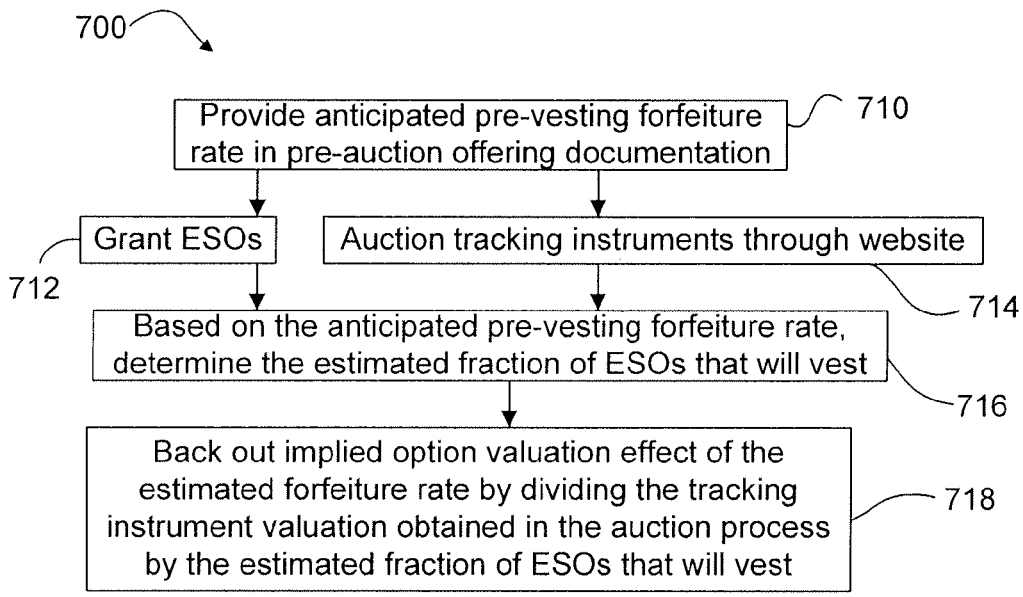
FIGS. 7-10 are flow charts of methods for handling pre-vesting forfeitures of employee stock options according to certain embodiments.

FIG. 7 is a flow chart of a method 700 for handling pre-vesting forfeitures of ESOs 114 according to one embodiment. The method 700 provides 710 an anticipated pre-vesting forfeiture rate to potential bidders in pre-auction offering documentation. The disclosure of this estimated rate allows the potential bidders to incorporate the anticipated prevesting forfeiture rate into their bid prices. Based on the anticipated pre-vesting forfeiture rate, the method 700 determines 716 the estimated fraction of ESOs 114 that will be forfeited before vesting.

The method 700 then backs out 718 the implied valuation effect of the estimated forfeiture rate on each of the tracking instruments 110 and accordingly adjusts the final total expense recognized for the ESO grant 132. This is done by dividing the tracking instrument valuation obtained in the auction process by the estimated fraction of ESOs 114 that will vest. The tracking instrument valuation is then converted into a valuation of the underlying ESO 114, which can then be used to measure accounting expense.

For example, assume that the tracking instruments 110 are auctioned for $7.50 each. Also assume that the bidders were given an estimated ESO forfeiture rate of 12.5%, which implies that 87.5% of the ESOs 114 are expected to vest. Dividing the auction-determined price of the tracking instruments ($7.50) by the estimated fraction of ESOs 114 expected to vest (0.875) gives a tracking instrument valuation adjusted for pre-vesting forfeitures of approximately $8.57.

Figure 8:
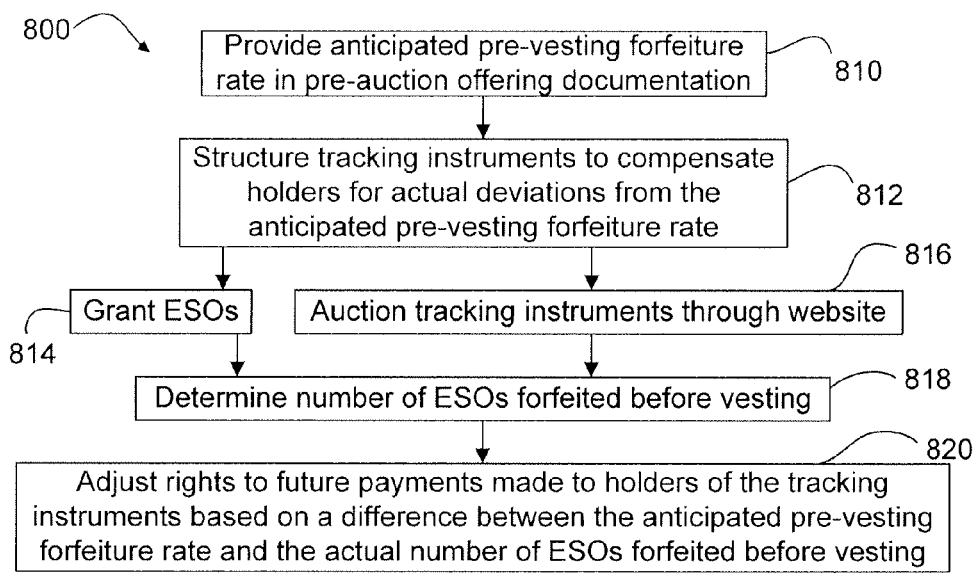

FIG. 8 is a flow chart of a method 800 for handling pre-vesting forfeitures of ESOs 114 according to another embodiment. The method 800 provides 810 an anticipated pre-vesting forfeiture rate to potential bidders in pre-auction offering documentation. However, the method 800 also structures 812 the tracking instruments 110 to compensate the respective holders for actual deviations from the anticipated pre-vesting forfeiture rate. Thus, potential bidders do not need to consider payment for ESOs 114 that do not vest. The final total valuation of the tracking instruments 110 is the market-clearing price per tracking instrument 110 times the number of tracking instruments 110 auctioned. The final total valuation of the tracking instruments 110 is then used to derive the final total expense recognized for the ESO grant 132, as discussed above.

After granting 814 the ESOs 114 and auctioning 816 the tracking instruments 110 through the website, as discussed above, the method 800 determines 818 the number of ESOs 114 that are forfeited before vesting. The method 800 then adjusts 820 the rights 136 to future payments made to holders of the tracking instruments based on the difference between the anticipated pre-vesting forfeiture rate and the actual number of ESOs 114 forfeited before vesting.

For example, assume that the anticipated pre-vesting forfeiture rate is 10% and the actual pre-vesting forfeiture rate is 15%. Payments to the current holders 142 of the tracking instruments 110 is 90/85 of the expected payments, which provides approximately $1.06 for every dollar initially expected to be paid (based on the anticipated pre-vesting forfeiture rate) to the current holders 142 of the tracking instruments 110.

Figure 9:
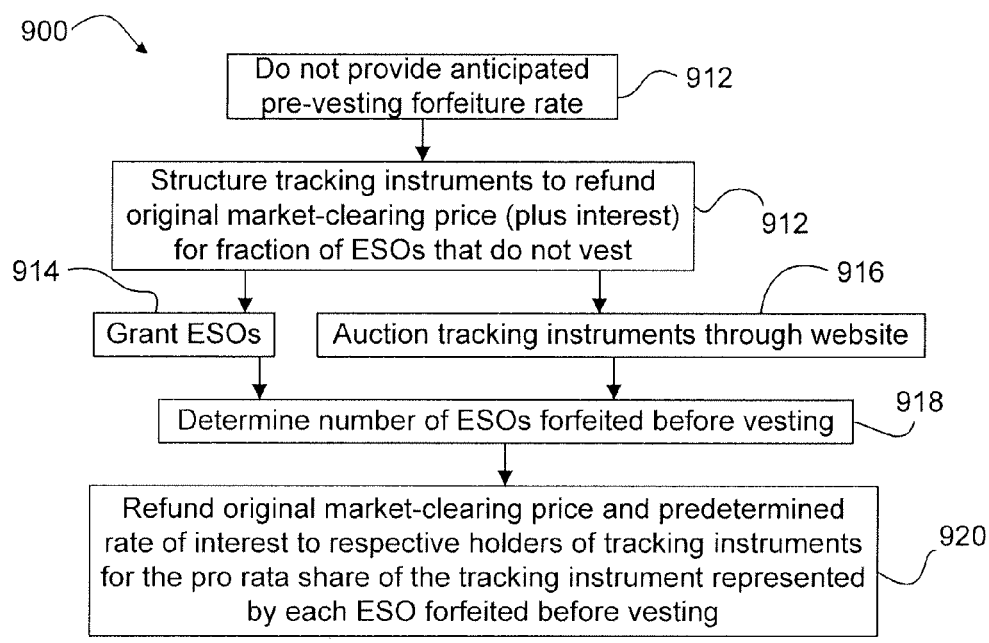

FIG. 9 is a flow chart of a method 900 for handling pre-vesting forfeitures of ESOs 114 according to another embodiment. In this embodiment, the anticipated pre-vesting forfeiture rate is not provided 910 to the potential bidders and the tracking instruments 110 are structured 912 to refund the original market-clearing price of the tracking instrument (plus interest) for the fraction of ESOs 114 that do not vest. Thus, the bidders are made whole for the fraction of ESOs that do not vest and therefore do not need to take pre-vesting forfeitures into account when submitting bids.

After granting 914 the ESOs 114 and auctioning 916 the tracking instruments 110 through the website, as discussed above, the method 900 determines 918 the number of ESOs 114 that are forfeited before vesting. The method 900 then refunds 920 the market-clearing price at which the tracking instruments were sold and a predetermined rate of interest to respective holders 142 of the tracking instruments 110 for the pro rata share of the tracking instrument represented by each ESO 114 forfeited before vesting. In one embodiment, the refund payments are made periodically (e.g., quarterly) during the vesting period 116 as the ESOs 114 are forfeited. Thus, the pre-vesting forfeitures are removed from the bidders' consideration so that they only bid on and receive distributions for units that actually vest.

Figure 10:
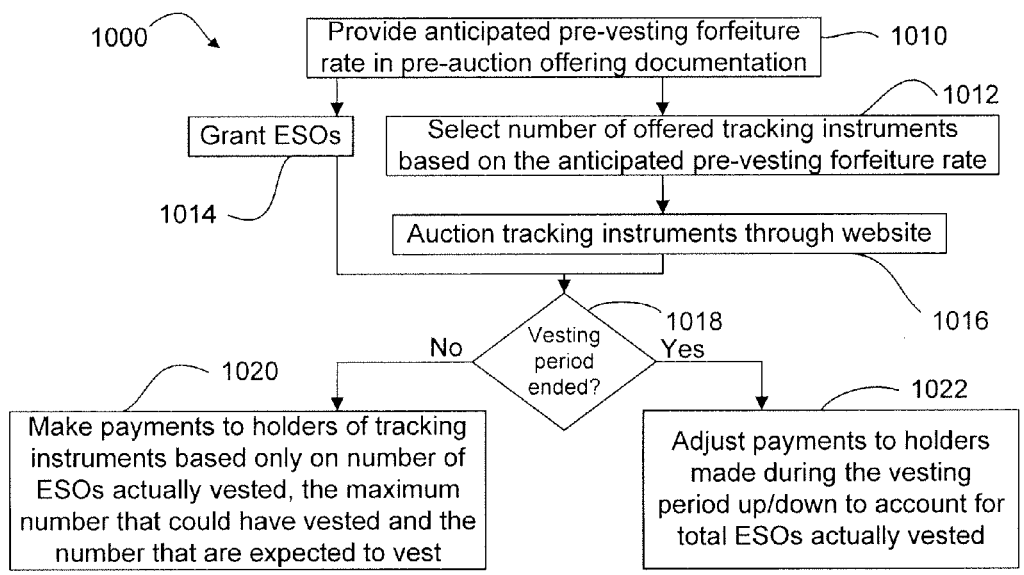

FIG. 10 is a flow chart of a method 1000 for handling prevesting forfeitures of ESOs 114 according to another embodiment. Among other things, the method 1000 overcomes a problem of paying the current holders 142 too much during the vesting period 116. The method 1000 provides 1010 an anticipated pre-vesting forfeiture rate to potential bidders in pre-auction offering documentation and selects 1012 the number of offered tracking instruments 110 based on the anticipated pre-vesting forfeiture rate.

If the estimated number of vesting ESOs 114 (based on the pre-vesting forfeiture rate) differs from the number of ESOs 114 that actually vests, a different number of reference options will be available for exercise than was anticipated by bidders. Therefore, the payments to bidders are adjusted up or down so that the payment they receive will be the same as if the estimated number of ESOs 114 is actually realized. This eliminates or reduces the need for bidders to consider pre-vesting forfeitures in their estimation of the value of the tracking instruments 110.

Total payments made to the current holders 142 of the tracking instruments 110 over the life of the reference ESOs 114 is computed, in one embodiment, as the cumulative net realized value from the exercise of the reference ESOs 114 by the employees 134, multiplied by the pro rata share of the net realized value defined by the tracking instruments 110, multiplied by the percentage of the reference ESOs 114 that are expected to vest, divided by the percentage of the reference ESOs 114 actually vested.

Since the fraction of the reference ESOs 114 that will actually vest is not known and will not be known until the vesting period 116 has passed, payments to the current holders 142 of the tracking instruments 110 will be computed using different formulas during the vesting period 116 and after the vesting period 116. This is done to ensure that payments made during the vesting period 116 do not exceed the payments that should be made based on the above formula.

For example, if a higher percentage of the reference ESOs 114 vested than was anticipated, according to the above formula, payments to the current holders 142 would need to be reduced. However, for example, if no reference ESOs 114 were exercised subsequent to the vesting period 116, there would not be an opportunity to reflect in payments to the current holders 142 the higher-than-anticipated vesting rate. The final payment made to the current holders 142 for the reference ESOs 114 exercised during the vesting period 116 will reflect the actual vesting rate so that the above formula holds for the vesting period 116.

Thus, after granting 1014 the ESOs 114 and auctioning 1016 the tracking instruments 110 through the website, as discussed above, the method 1000 queries 1018 whether the vesting period 116 has ended. If the vesting period 116 has not ended, the method makes 1020 payments to the current holders 142 of the tracking instruments 110 based only on the number of reference ESOs 114 that have actually vested relative to the maximum number of ESOs 114 that could have vested and the number of ESOs that are expected to vest according to the anticipated pre-vesting forfeiture rate.

In other words, the payments to the current holders 142 during the vesting period 116 is computed as the net realized value from the exercise of the reference ESOs 114 by the employees 134 during the vesting period 116, multiplied by the pro rata share of the net realized value defined by the tracking instruments 110, multiplied by the percentage of the reference ESOs 114 that are expected to vest during the vesting period 116, multiplied by the maximum number of reference ESOs 114 that could have vested had there been no forfeitures during the vesting period 116, divided by the actual number of reference ESOs 114 that have vested during the vesting period 116.

Using the above formula during the vesting period 116, there may be a slight difference between what was paid and the total payment formula set forth above, evaluated at the end of the final vesting period. Thus, after the vesting period 116, the method 1000 adjusts 1022 the payments made to the current holders 142 made during the vesting period 116 to account for the total ESOs 114 actually vested. Following the vesting period, payments to the current holders 142 are computed as the net realized value from the exercise of the reference ESOs 114 by the employees 134, multiplied by the pro rata share of the net realized value defined by the tracking instruments 110, multiplied by the percentage of the reference ESOs 114 that are expected to vest, divided by the percentage of the reference ESOs 114 actually vested.

Grant Date

FAS 123R requires the valuation of ESOs 114 on the grant date. This is the date the details of the plan are communicated to and accepted by employees. An issue that might arise is the desirability and/or necessity of publishing to potential bidders the details of the plan in advance of the grant date so that the auction can take place on the grant date. However, if the details of the plan are conveyed to potential bidders, they would likely find their way into the public domain and to the employees 134. The standard also notes that the grant date cannot occur until the plan is approved by the board of directors, if so required. Companies may be encouraged to make this a requirement in certain embodiments. In one embodiment, the auction may be held after the stock market closes on the grant date and before it opens on the following day. This may be done to avoid prematurely publishing to potential bidders the details of the ESO grant plan.

FAS 123R defines the grant date as the date when the employer 113 and the employees 134 have a mutual understanding of the key terms and conditions of the grant. One of the key terms may be the exercise price 118 of the ESOs 114. Paragraph A78 of FAS 123R indicates that the exercise price 118 must be known for the grant to have occurred. Thus, in one embodiment, the grant date and the auction date may be aligned by delaying the setting of the exercise price 118 until the auction date.

Offering Memorandum/Prospectus

In certain embodiments disclosed herein the employer 113 provides an offering memorandum/prospectus to potential investors in the tracking instruments 110. The offering memorandum/prospectus provides potential investors with available information to estimate the value of the tracking instruments being offered. The memorandum may include such details as the number of ESOs 114 being granted, service and performance conditions (as defined by FAS 123R), relevant dates, number and types of employees receiving options, post-vesting cancellations, and other useful investment information, broken down into incentive and non-qualified categories. The memorandum may be posted on the Internet and/or a system such as Bloomberg that is available to qualified investors.

As discussed above, the memorandum may also include the employer's expectation for the number of options that will be exercised as well as historical data supporting that expectation. Estimates for pre-vesting forfeitures may include, for example, information on the number of options that are incentive versus non-qualified.

In one embodiment, a document such as a prospectus supplement may summarize information and graphs showing the exercise pattern of the employees 134 for past option grants. For those bidders wanting to complete a more detailed analysis of exercise patterns, free writing prospectuses or other such documents may be provided with the exercise-by-exercise data that underlies the summarized information. The detailed and summarized information may be made available on the SEC Edgar web site.

In addition to providing information potentially useful to prospective bidders for valuation purposes, the information distribution plan may have the secondary objective of informing a sufficient number of bidders of the opportunity to participate in the tracking instruments auction. In order to ensure competitive pricing, a sufficient number of bidders may or should be brought into the auction process. For a market-clearing price to be used to determine fair market value, the FASB requires that the price be derived from an active market. Thus, in one embodiment, as many bidders as possible are attracted through national and local advertising, press releases, working with reporters from national publications in order to get news articles published, and personal contact with known potential bidders.

Registration of Derivative Securities

In one embodiment, the tracking instruments 110 are issued under Rule 144A under the Securities Act of 1933 and are available to the qualified retail investors 130. Alternatively, the tracking instruments 110 may be registered securities. For example, a company could offer tracking instruments 110 through a fully registered offering, such as under the issuing company's WKSI (Well Known Seasoned Issuer) shelf registration with the SEC. The issuing company could participate in the offering of tracking instruments 110 for third party issuers, but could, alternatively, offer them directly to purchasers itself.

Figure 11:
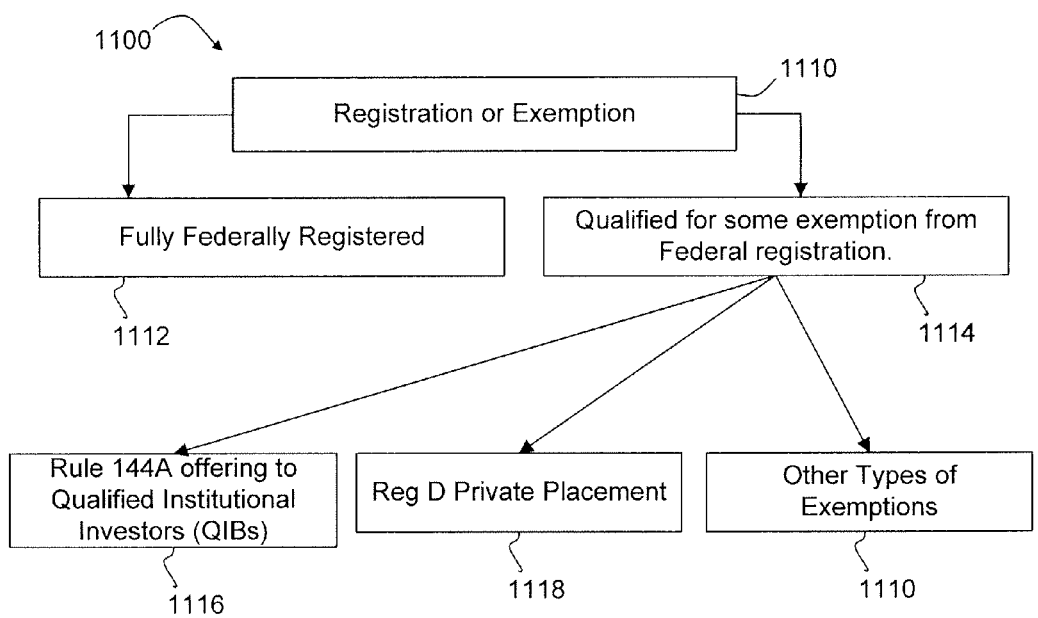
FIG. 11 is a flow chart of various options for registration or exemption from registration for derivative securities.

FIG. 11 is a flow chart of various options 1100 for registration or exemption from registration for derivative securities (e.g., the tracking instruments 110). As illustrated, one option 1110 is for the derivative securities to be registered or exempted from registration. For example, the derivative securities may be fully federally registered 1112. Alternatively, the derivative securities may qualify 1114 for some exemption to Federal registration, such as a Rule 144A offering 1116 to Qualified Institutional Buyers (QIBs), a Reg. D private placement 1118, or qualifying 1110 under another type of exemption.

Example Auctioning System

Figure 12:
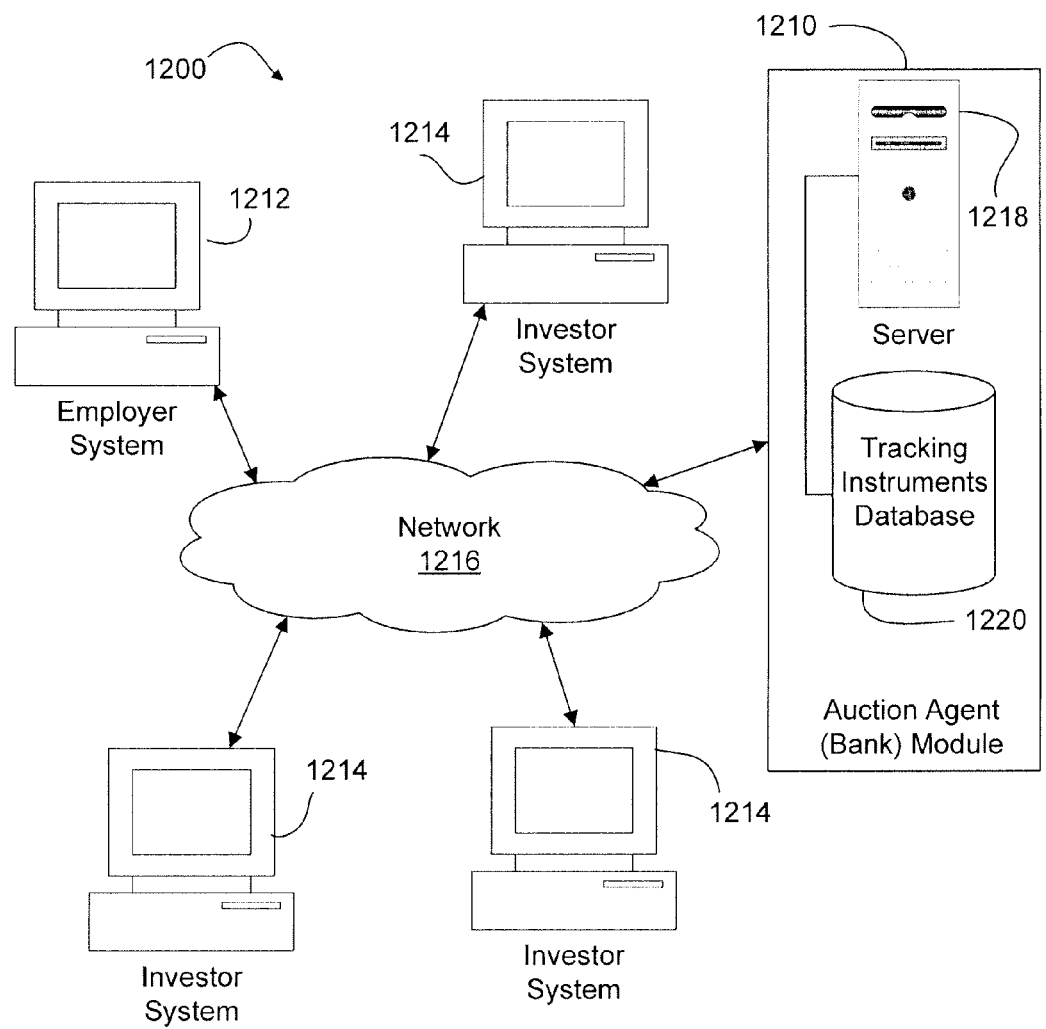
FIG. 12 is a block diagram of an example system for auctioning tracking instruments corresponding to employee stock options according to one embodiment.

FIG. 12 is a block diagram of an example system 1200 for auctioning tracking instruments 110 corresponding to ESOs 114 according to one embodiment. The example system 1200 includes an auction agent module 1210 in communication with one or more employer systems 1212 (one shown) and a plurality of investor systems 1214 (three shown) through a network 1216. The illustrated components may be implemented using any suitable combination of hardware, software, and/or firmware.

The network 1216 may include, for example, the Internet or World Wide Web, an intranet such as a local area network (LAN) or a wide area network (WAN), a public switched telephone network (PSTN), a cable television network (CATV), or any other network of communicating computerized devices.

The auction agent module 1210 includes a server 1218 and a tracking instruments database 1220. An artisan will recognize from the disclosure herein that the server 1218 and the tracking instruments database 1220 can be implemented on one or more computers. Further, the employer system 1212 and the investor systems 1214 may include computers to communicate through the network 1216. These computers, may be single-processor or multiprocessor machines and may include memory having software modules or coded instructions for performing the processes described herein.

The server 1218 is configured to create, issue, and auction tracking instruments 110 to the investor systems 1214 through a website, as disclosed herein. The server 1218 also provides ESO grant 132 valuation and determines payments to the current holders 142 of the tracking instruments 110, as disclosed herein. Thus, the tracking instruments database 1220 includes information used for performing the methods discussed herein. Such information may include, for example, identity and contact information of the current holders 142 and records of the terms provided by the tracking instruments 110. The database 1220 may also include information related to the corresponding ESOs 114 such as pre-vesting forfeiture information, post-vesting forfeiture information, and modification information.

As discussed above, the server 1218 may also facilitate an aftermarket for the tracking instruments 110 that the server 1218 initially auctions to the investor systems 1214. Thus, the server 1218 may provide a website selling or auctioning platform for the investor systems 1214 to sell their respective tracking instruments 110 initially purchased through the online auction from the employer system 1212 or a grantor trust system (not shown), to third party investors. The server 1218 may also provide cross trades between the initial investor systems 1214. For example, a large holder of the tracking instruments 110 may want to divest its holdings by scheduling and running an auction through the website provided by the server 1218.

The auction agent module 1210 may be provided for example, by a third party auctioning agent, the employer system 1212, or a bank. A bank, for example, may take on several roles in creating, issuing, auctioning, and managing the tracking instruments 110, as disclosed herein. For example, a bank may: act as a financial consultant to advise the employer system 1212 on the details of the structure of the contracts and the auction process; hold the auction or act as an auction agent or placement agent for the tracking instruments; provide trust services for the collection and distribution of cash flows, such as in the capacity of trustee, transfer agent, or paying agent; provide the current holders 142 of the tracking instruments 110 and the marketplace a monthly summary of the current vesting, pre-vesting forfeiture, and exercise status of the ESOs 114 associated with their respective tracking instruments 110; act as a riskless principal purchaser or underwriter; act as an information agent; act in some other auxiliary capacity in connection with the issuance, offering, sale, distribution, delivery, registration, payment, and/or transfer of the tracking instruments 110; provide consulting services to assist in the unwinding of modified ESOs 114, as discussed above; and/or assist the employer system 1212 in preparing and circulating an offering memorandum/prospectus regarding the tracking instruments 110.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for estimating an expense of employee stock option grants, the method comprising:
providing tracking instruments that give holders of the tracking instruments rights to future payments proportional to a value, if any, actually realized by grantees of the employee stock options upon exercising the employee stock options, wherein the rights to future payments are independent of current holders of the tracking instruments such that each current holder of one or more of the tracking instruments respectively receives a pro rata share of a predetermined portion of the net value of the employee stock options actually realized as the grantees of the employee stock options exercise their respective employee stock options;
storing information about the tracking instruments in a tracking instrument database of an auction system, the auction system including a processor to communicate with one or more investor systems through a network;
electronically auctioning, using the processor of the auction system, the tracking instruments to bidders through a website, wherein the auction system receives bids from the one or more investor systems through the network during the electronic auctioning of the tracking instruments; and
deriving the expense of granting the employee stock options from a price paid by the bidders for the tracking instruments.

2. The method of claim 1, wherein electronically auctioning the tracking instruments comprises auctioning the tracking instruments on the grant date of the employee stock options.

3. The method of claim 2, further comprising:
delaying the setting of an exercise price for the employee stock options until the grant date.

4. The method of claim 1, further comprising:
allowing the bidders to immediately resell their respective tracking instruments purchased through the electronic auction.

5. The method of claim 4, wherein reselling the respective tracking instruments comprises allowing the bidders to resell their respective tracking instruments through the website.

6. The method of claim 5, wherein reselling the respective tracking instruments through the website comprises re-auctioning the respective tracking instruments through the website.

7. The method of claim 1, further comprising:
determining that the employee stock options have been modified;
canceling the original grant of the employee stock options; and
compensating the holders of the tracking instruments based on a model valuation.

8. The method of claim 7, wherein the model valuation is performed by an independent agent.

9. The method of claim 7, further comprising:
treating the modification as a new grant of modified employee stock options; and
valuing the modified employee stock options by auctioning new tracking instruments for the modified employee stock options.

10. The method of claim 1, further comprising:
providing the bidders with an estimated pre-vesting forfeiture rate for the employee stock options before electronically auctioning the tracking instruments, the rate providing an estimation of a portion of the employee stock options expected to be forfeited before vesting.

11. The method of claim 10, wherein deriving the expense of granting the employee stock options comprises removing the portion of employee stock options expected to be forfeited before vesting from the derived expense of granting the employee stock options.

12. The method of claim 11, wherein removing the portion of employee stock options expected to be forfeited before vesting from the derived expense comprises dividing the auction proceeds per tracking instrument by the fraction of employee stock options expected to vest.

13. The method of claim 10, further comprising:
changing the rights to future payments in proportion to a difference between the estimated portion of the employee stock options expected to be forfeited before vesting and an actual number of employee stock options forfeited before vesting.

14. The method of claim 10, further comprising:
during a vesting period, making payments to the holders of the tracking instruments based only on a number of employee stock options actually vested relative to a maximum number of employee stock options that could have vested and a number of employee stock options that are still expected to vest.

15. The method of claim 14, wherein the payments made to the holders of the tracking instruments during the vesting period comprise the value actually realized by the grantees upon exercising the employee stock options, multiplied by a pro rata share of the value actually realized defined by the tracking instruments, multiplied by a percentage of the employee stock options that are expected to vest, multiplied by the maximum number of employee stock options that could have vested had there been no forfeitures during the vesting period, divided by the number of employee stock options actually vested.

16. The method of claim 15, further comprising:
after the vesting period, adjusting the payments made to the holders of the tracking instruments to account for a total number of employee stock options actually vested during the entire vesting period.

17. The method of claim 1, further comprising:
refunding to holders of the tracking instruments the price paid by the bidders for a portion of the employee stock options that are forfeited before vesting.

18. The method of claim 17, further comprising:
paying interest to the holders of the tracking instruments on the refunded portion of the price paid by the bidders.

19. The method of claim 1, further comprising:
periodically determining a number of employee stock options exercised by the respective grantees to purchase underlying securities at respective exercise prices;
determining the value, if any, actually realized by the grantees of the employee stock options during a particular period to be an amount by which respective trading prices of the underlying securities at the time of exercise exceed the respective exercise prices, multiplied by the respective number of employee stock options exercised; and
paying the holders of the tracking instruments the value, if any, actually realized by the grantees of the employee stock options during the particular period.

20. The method of claim 1, wherein the rights to future payments are in a range between approximately 5% and approximately 15% of the value, if any, actually realized by the grantees of the employee stock options.

21. The method of claim 1, wherein the price paid by the bidders for the tracking instruments comprises a single market-clearing price, based on respective bids, at which all of the tracking instruments are sold to one or more of the bidders.

22. The method of claim 21, wherein the respective bids of each of the one or more bidders allowed to purchase the tracking instruments are greater than or equal to the market-clearing price.

23. The method of claim 22, further comprising:
initially limiting the tracking instruments that are provided to the bidders through the electronic auction to a fixed number; and allocating the fixed number of tracking instruments by order of priority based on respective bid prices.

24. The method of claim 23, further comprising:
if two or more of the bidders submit respective bids at a same bid price, each greater than or equal to the market-clearing price, allocating the tracking instruments to the two or more tied bidders on a pro rata basis according to respective quantities of tracking instruments requested.

25. The method of claim 21, further comprising:
displaying a current market clearing price to the bidders during the electronic auction.

26. The method of claim 1, wherein the bidders comprise retail bidders.

27. A system for estimating an expense of granting stock options, the system comprising:
tracking means for providing rights to future payments proportional to a value, if any, actually realized by grantees of the stock options upon exercising the stock options, wherein the rights to future payments are independent of current holders of the tracking instruments such that each current holder of one or more of the tracking instruments respectively receives a pro rata share of a predetermined portion of the net value of the employee stock options actually realized as the grantees of the employee stock options exercise their respective employee stock options;

auctioning means for selling the tracking means to one or more bidders through a website for a first market-clearing price; and means for deriving the expense of granting the stock options from the first market-clearing price.

28. The system of claim 27, wherein the tracking means comprises rules for handling a modification to a first grant of the stock options.

29. The system of claim 28, wherein the rules comprise:
canceling the first grant of the stock options;
compensating holders of the tracking means based on a model valuation of the canceled grant;
treating the modification of the first grant as a second grant of stock options; and
auctioning new tracking means corresponding to the second grant.

30. The system of claim 27, wherein the tracking means comprises rules for handling forfeitures of the stock options.

31. The system of claim 30, wherein the rules comprise:
providing the bidders with an estimated pre-vesting forfeiture rate for the stock options before selling the tracking means, the rate providing an estimation of a portion of the stock options expected to be forfeited before vesting.

32. The system of claim 31, wherein the means for deriving the expense of granting the stock options removes the portion of stock options expected to be forfeited before vesting from the derived expense of granting the stock options.

33. The system of claim 32, wherein removing the portion of stock options expected to be forfeited before vesting from the derived expense comprises dividing the total proceeds received from selling the tracking means for all of the tracking means by the number of stock options expected to vest.

34. The system of claim 31, wherein the rules further comprise:
during a vesting period, making payments to holders of the tracking means based only on a number of stock options actually vested relative to a maximum number of stock options that could have vested and a number of stock options that are still expected to vest.

35. The system of claim 34, wherein the payments made to the holders of the tracking means during the vesting period comprise the value actually realized by the grantees upon exercising the stock options, multiplied by a pro rata share of the value actually realized defined by the tracking means, multiplied by a percentage of the stock options that are expected to vest, multiplied by the maximum number of stock options that could have vested had there been no forfeitures during the vesting period, divided by the number of stock options actually vested.

36. The system of claim 35, wherein the rules further comprise:
after the vesting period, adjusting the payments made to the holders of the tracking means to account for a total number of stock options actually vested during the entire vesting period.

37. The system of claim 30, wherein the rules comprise:
refunding to holders of the tracking means the price paid by the bidders for a portion of the stock options that are forfeited before vesting.

38. The system of claim 37, wherein the rules further comprise:
paying interest to the holders of the tracking means on the refunded portion of the price paid by the bidders.

39. A machine-readable storage medium having program code stored thereon which, when executed by a processor, cause said processor to perform the operations of:
providing derivative securities corresponding to underlying stock options that give holders of the derivative securities rights to future payments proportional to a value, if any, actually realized by grantees of the stock options upon exercising the stock options, wherein the rights to future payments are independent of current holders of the derivative securities such that each current holder of one or more of the derivative securities respectively receives a pro rata share of a predetermined portion of the net value of the stock options actually realized as the grantees of the stock options exercise their respective stock options;
electronically auctioning the derivative securities to bidders through a website; and
deriving the expense of granting the stock options from a price paid by the bidders for the derivative securities.

40. The machine-readable storage medium of claim 39, wherein electronically auctioning the derivative securities comprises auctioning the derivative securities on the grant date of the stock options.

41. The machine-readable storage medium of claim 40, the program code further causing the processor to perform the operation of:
delaying the setting of an exercise price for the stock options until the grant date.

42. The machine-readable storage medium of claim 39, the program code further causing the processor to perform the operation of:
allowing the bidders to immediately resell their respective derivative securities purchased through the electronic auction.

43. The machine-readable storage medium of claim 42, wherein reselling the respective derivative securities comprises allowing the bidders to resell their respective derivative securities through the website.

44. The machine-readable storage medium of claim 43, wherein reselling the respective derivative securities through the website comprises re-auctioning the respective derivative securities through the website.

45. The machine-readable storage medium of claim 39, the program code further causing the processor to perform the operation of:
determining that the stock options have been modified;
canceling the original grant of the stock options; and
compensating the holders of the derivative securities based on a model valuation.

46. The machine-readable storage medium of claim 45, wherein the model valuation is performed by an independent agent.

47. The machine-readable storage medium of claim 45, the program code further causing the processor to perform the operation of:
treating the modification as a new grant of modified stock options; and
valuing the modified stock options by auctioning new derivative securities for the modified stock options.

48. The machine-readable storage medium of claim 39, the program code further causing the processor to perform the operation of:

providing the bidders with an estimated pre-vesting forfeiture rate for the stock options before electronically auctioning the derivative securities, the rate providing an estimation of a portion of the stock options expected to be forfeited before vesting.

49. The machine-readable storage medium of claim 48, wherein deriving the expense of granting the stock options comprises removing the portion of stock options expected to be forfeited before vesting from the derived expense of granting the stock options.

50. The machine-readable storage medium of claim 49, wherein removing the portion of stock options expected to be forfeited before vesting from the derived expense comprises dividing the total auction proceeds for all of the derivative securities by the number of stock options expected to vest.

51. The machine-readable storage medium of claim 48, the program code further causing the processor to perform the operation of:
   changing the rights to future payments in proportion to a difference between the estimated portion of the stock options expected to be forfeited before vesting and an actual number of stock options forfeited before vesting.

52. The machine-readable storage medium of claim 48, the program code further causing the processor to perform the operation of:
   during a vesting period, making payments to the holders of the derivative securities based only on a number of stock options actually vested relative to a maximum number of stock options that could have vested and a number of stock options that are still expected to vest.

53. The machine-readable storage medium of claim 52, wherein the payments made to the holders of the derivative securities during the vesting period comprise the value actually realized by the grantees upon exercising the stock options, multiplied by a pro rata share of the value actually realized defined by the derivative securities, multiplied by a percentage of the stock options that are expected to vest, multiplied by the maximum number of stock options that could have vested had there been no forfeitures during the vesting period, divided by the number of stock options actually vested.

54. The machine-readable storage medium of claim 53, the program code further causing the processor to perform the operation of:
   after the vesting period, adjusting the payments made to the holders of the derivative securities to account for a total number of stock options actually vested during the entire vesting period.

55. The machine-readable storage medium of claim 39, the program code further causing the processor to perform the operation of:
   refunding to holders of the derivative securities the price paid by the bidders for a portion of the stock options that are forfeited before vesting.

56. The machine-readable storage medium of claim 55, the program code further causing the processor to perform the operation of:
   paying interest to the holders of the derivative securities on the refunded portion of the price paid by the bidders.

57. The machine-readable storage medium of claim 39, the program code further causing the processor to perform the operation of:
   periodically determining a number of stock options exercised by the respective grantees to purchase underlying securities at respective exercise prices;
   determining the value, if any, actually realized by the grantees of the stock options during a particular period to be an amount by which respective trading prices of the underlying securities at the time of exercise exceed the respective exercise prices, multiplied by the respective number of stock options exercised; and
   paying the holders of the derivative securities the value, if any, actually realized by the grantees of the stock options during the particular period.

58. The machine-readable storage medium of claim 39, wherein the rights to future payments are in a range between approximately 5% and approximately 15% of the value, if any, actually realized by the grantees of the stock options.

59. The machine-readable storage medium of claim 39, wherein the price paid by the bidders for the derivative securities comprises a single market-clearing price, based on respective bids, at which all of the derivative securities are sold to one or more of the bidders.

60. The machine-readable storage medium of claim 59, wherein the respective bids of each of the one or more bidders allowed to purchase the derivative securities are greater than or equal to the market-clearing price.

61. The machine-readable storage medium of claim 60, the program code further causing the processor to perform the operation of:
   initially limiting the derivative securities that are provided to the bidders through the electronic auction to a fixed number; and
   allocating the fixed number of derivative securities by order of priority based on respective bid prices.

62. The machine-readable storage medium of claim 61, the program code further causing the processor to perform the operation of:
   if two or more of the bidders submit respective bids at a same bid price, each greater than or equal to the market-clearing price, allocating the derivative securities to the two or more tied bidders on a pro rata basis according to respective quantities of derivative securities requested.

63. The machine-readable storage medium of claim 62, the program code further causing the processor to perform the operation of:
   if the pro rata allocation results in a fractional tracking instrument being awarded to a bidder, rounding the fractional tracking instrument to a whole tracking instrument.

64. The machine-readable storage medium of claim 59, the program code further causing the processor to perform the operation of:
   displaying a current market clearing price to the bidders during the electronic auction.

65. The machine-readable storage medium of claim 39, wherein the bidders comprise retail bidders.

66. The system of claim 31, wherein the rules further comprise:
   changing the rights to future payments in proportion to a difference between the estimated portion of the stock options expected to be forfeited before vesting and an actual number of stock options forfeited before vesting.

\* \* \* \* \*